US012711706B2

(12) United States Patent
Wang et al.

(10) Patent No.: US 12,711,706 B2
(45) Date of Patent: Aug. 18, 2026

(54) FLUFF RENDERING METHOD AND APPARATUS, AND DEVICE AND MEDIUM

(71) Applicant: Beijing Bytedance Network Technology Co., Ltd., Beijing (CN)

(72) Inventors: Ze Wang, Beijing (CN); Dou Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 87 days.

(21) Appl. No.: 18/709,153

(22) PCT Filed: Nov. 2, 2022

(86) PCT No.: PCT/CN2022/129194
§ 371 (c)(1),
(2) Date: May 10, 2024

(87) PCT Pub. No.: WO2023/083067
PCT Pub. Date: May 19, 2023

(65) Prior Publication Data

US 2025/0005854 A1 Jan. 2, 2025

(30) Foreign Application Priority Data

Nov. 10, 2021 (CN) ........................ 202111329287.9

(51) Int. Cl.
*G06T 17/00* (2006.01)
*G06T 15/04* (2011.01)

(52) U.S. Cl.
CPC .............. *G06T 17/00* (2013.01); *G06T 15/04* (2013.01)

(58) Field of Classification Search
CPC ..... G06T 15/00; G06T 17/00; G06T 2210/16; G06T 11/001; G06T 15/50;
(Continued)

(56) References Cited

U.S. PATENT DOCUMENTS

2003/0071812 A1* 4/2003 Guo ........................ G06T 15/00 345/426
2007/0291050 A1 12/2007 Bruderlin et al.
2010/0063789 A1 3/2010 Imao et al.

FOREIGN PATENT DOCUMENTS

CN 109685876 A 4/2019
CN 111369658 A 7/2020
(Continued)

OTHER PUBLICATIONS

ISA China National Intellectual Property Administration, International Search Report and Written Opinion Issued in Application No. PCT/CN2022/129194, Jan. 19, 2023, WIPO, 14 pages.
(Continued)

*Primary Examiner* — Hau H Nguyen
(74) *Attorney, Agent, or Firm* — Alleman Hall LLP

(57) ABSTRACT

Disclosed in the present application are a fluff rendering method and apparatus, and a device and a medium. When fluff rendering needs to be performed on an object to be rendered, a fluff rendering parameter of the object is acquired, wherein the fluff rendering parameter includes one or more modeling parameters for fluff, and each modeling parameter in the one or more modeling parameters corresponds to one fluff modeling effect; and after the fluff rendering parameter is acquired, the object is rendered according to the fluff rendering parameter, so as to obtain a fluff model of the object. Therefore, in the embodiments of the present application, by means of acquiring a plurality of fluff modeling parameters in advance to render fluff of a plurality of models, the diversification of fluff models is improved.

19 Claims, 4 Drawing Sheets

(58) Field of Classification Search
CPC ............. G06T 2210/56; G06T 2210/24; G06T 15/503; G06T 15/04; G06F 2113/12
See application file for complete search history.

(56) References Cited

FOREIGN PATENT DOCUMENTS

| | | | |
|---|---|---|---|
| CN | 111462313 | A | 7/2020 |
| CN | 111862290 | A | 10/2020 |
| CN | 113345098 | A | 9/2021 |

OTHER PUBLICATIONS

China National Intellectual Property Administration, Office Action and Search Report Issued in Application No. 202111329287.9, Mar. 31, 2026, 17 pages.

* cited by examiner

FLUFF RENDERING METHOD AND APPARATUS, AND DEVICE AND MEDIUM

CROSS-REFERENCE TO RELATED APPLICATION

The present application is a national stage of the International application PCT/CN2022/129194, filed on Nov. 2, 2022. This International application claims priority to Chinese Patent Application No. 202111329287.9, filed on Nov. 10, 2021, entitled "A Fluff Rendering Method, apparatus, Device, and Medium," the entire contents of which are incorporated herein by reference.

TECHNICAL FIELD

The present application relates to computer processing technology, and in particular, to a fluff rendering method, apparatus, device, and medium.

BACKGROUND

Fluff appears very frequently in life, including various hats, garments, scarves, and the like, and in some telecine production, rendering of the appearing fluff is required in order to ensure the quality of the image. Fluff shapes that are rendered by currently adopted fluff rendering schemes are relatively simple, which does not meet a variety of demands.

SUMMARY

In view of the above, embodiments of the present disclosure provide a fluff rendering method, apparatus, device, and medium to provide a variety of fluff shapes and improve fluff rendering efficiency.

To achieve the above objective, the technical solutions provided by the embodiments of the present application are as follows:

In a first aspect of embodiments of the present application, a fluff rendering method is provided and the fluff rendering method includes:

- obtaining a fluff rendering parameter for an object to be rendered, wherein the fluff rendering parameter comprises one or more modeling parameters for fluff, different modeling parameters among the one or more modeling parameters are used to render the fluff with different shapes, the object to be rendered is an object requiring fluff rendering;
- rendering the object to be rendered according to the fluff rendering parameter, to obtain a fluff modeling of the object to be rendered.

In a second aspect of embodiments of the present application, a fluff rendering apparatus is provided and the fluff rendering apparatus includes:

- a first obtaining unit, configured to obtain a fluff rendering parameter for an object to be rendered, wherein the fluff rendering parameter comprises one or more modeling parameters for fluff, different modeling parameters of the one or more modeling parameters are used to render the fluff with different shapes, and the object to be rendered is an object requiring fluff rendering;
- a second obtaining unit, configured to render the object to be rendered according to the fluff rendering parameter, to obtain a fluff modeling of the object to be rendered.

In a third aspect of embodiments of the present application, an electronic device is provided, and the electronic device includes: a processor and a memory;

- the memory is configured to store instructions or a computer program;
- the processor is configured to execute the instructions or the computer program in the memory to cause the electronic device to perform the fluff rendering method.

In a fourth aspect of embodiments of the present application, a computer-readable storage medium is provided, and the computer-readable storage medium includes instructions which, when run on a computer, cause the computer to perform the fluff rendering method described above.

It can be seen that the present embodiments have the following beneficial effects:

DETAILED DESCRIPTION

Figure 1:
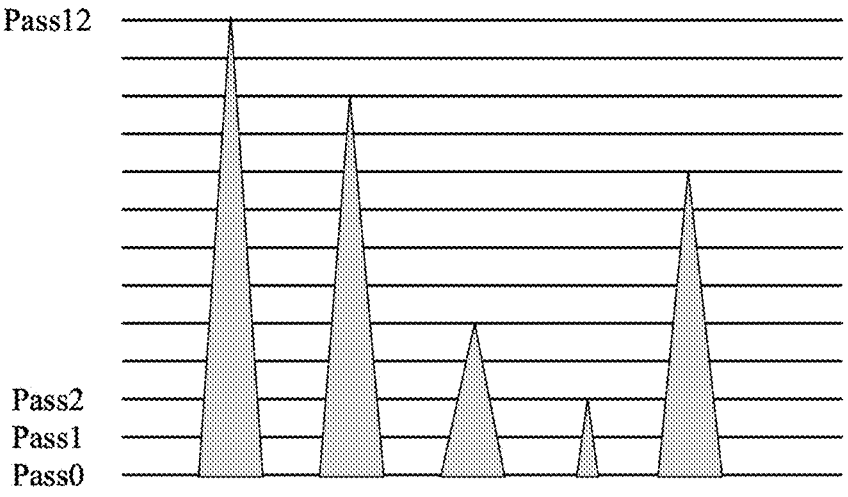
FIG. 1 is a diagram of a multi-pass fluff rendering model.

So that the above objects, features and advantages of the present invention will become more apparent, the following detailed description of an of the present invention will be described in detail with reference to the accompanying drawings and the detailed description. It is to be understood that the specific embodiments described herein are for illustrative purposes only, and are not intended to be limiting. Furthermore, it is to be noted that only some, but not all, structures pertinent to the present application are shown in the drawings for the convenience of the description.

With the development of multimedia technology, simulations of characters such as people or animals often appear in some multimedia videos, and the simulation of fluff will inevitably appear in the simulation process. However, the conventional fluff rendering method renders the fluff modeling relatively single and cannot satisfy the variety of fluff shapes desired by the user, which affects the user experience.

Based on this, an embodiment of the present disclosure provides a fluff rendering method. When performing fluff rendering on an object to be rendered, obtaining a fluff rendering parameter of the object to be rendered, the fluff rendering parameters includes one or more modeling parameters for the fluff, each of the one or more modeling parameters is used to render a fluff model. After the fluff rendering parameter is obtained, the object to be rendered is rendered using the fluff rendering parameter, so that when fluff rendering is performed on the object to be rendered, the fluff with different shapes can be rendered, which satisfies the user's diversified needs and improves the user's usage experience.

It should be noted that the fluff simulation in embodiments of the present disclosure can be implemented based on a multi-pass fluff rendering model, i.e., the rendering model is extruded in a specific direction for many times, and the transparency is reduced layer by layer to achieve the effect of simulating fluff. For example, as shown in FIG. 1, each Pass represents a layer, and the vertex position is shifted out along the normal in the vertex shader as each layer is rendered. In general, the greater the number of Pass used, the better the rendering effect.

To facilitate understanding of the technical solutions provided by the embodiments of the present disclosure, description will be made below in conjunction with the accompanying drawings.

Figure 2:
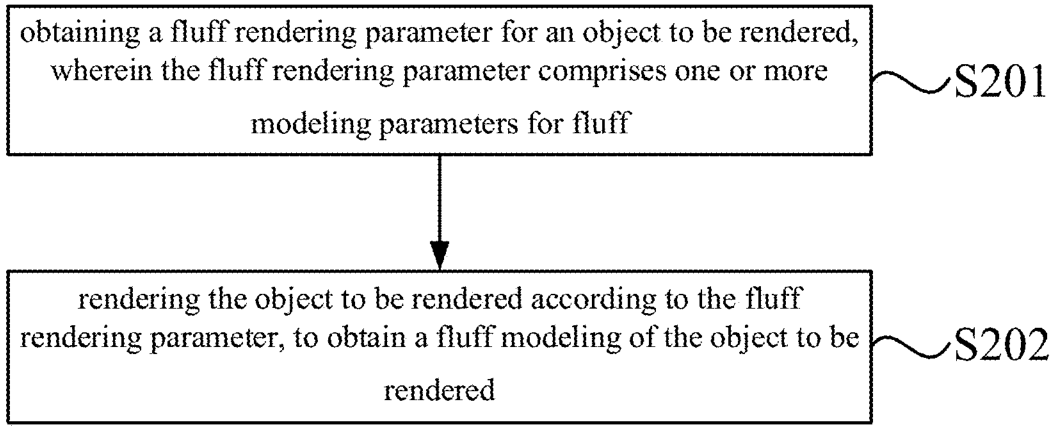
FIG. 2 is a flowchart illustrating a fluff rendering method according to an embodiment of the present disclosure.

Referring to FIG. 2, FIG. 2 is a flowchart of a fluff rendering method according to an embodiment of the present disclosure, which may be performed by a fluff rendering apparatus. The fluff rendering apparatus may be implemented in software and/or hardware, and may generally be integrated into an electronic device. As shown in FIG. 2, the method includes:

S201: obtaining a fluff rendering parameter for an object to be rendered.

In the present embodiment, when the object to be rendered needs to be subjected to fluff rendering, the corresponding fluff rendering parameters are obtained. The fluff rendering parameters may include one or more modeling parameters, different modeling parameters among the one or more modeling parameters are used to render the fluff with different shapes. The object to be rendered is an object for which fluff rendering is desired.

Alternatively, the modeling parameters may be a fluff spiral parameter that determines the fluff spiral modeling, the fluff spiral modeling refers to the modeling of the fluff spiraling around the normal (i.e. the initial growth direction), and the effect of the fluff spiraling around the normal may be rendered by the fluff spiral parameter. Or the modeling parameter may also be a parameter that determines the tail shape modeling of the fluff, the tail shape modeling of the fluff refers to the hair tail shape of the fluff, to reflect different states of the object to be rendered by the tail modeling of different shapes. For example, if the object to be rendered is an animal, the object to be rendered may be in an angry state by rendering the tail of the fluff to presents as a spike, or the object to be rendered may be in a normal state by rendering the tail of the fluff to presents as a feather duster. Alternatively, the modeling parameter may be a parameter that determines the fluff bending modeling, the fluff bending modeling refers to the bending effect of the fluff with respect to the initial growth direction, and the change of the fluff due to the influence of external factors may be simulated by the fluff bending modeling. For example, the phenomenon of fluff bending due to wind forces is simulated.

The fluff bending modeling may be implemented by adding fluff noise-wave, UV offset amount, flow direction parameter, and vertex color shift parameter. That is, the fluff rendering parameters may include one or more of a fluff spiral parameter, a fluff tail shape parameter, or a fluff bending parameter. The fluff bending parameter may include one or more of a fluff noise-wave parameter, a fluff UV offset parameter, a fluff flow direction parameter, or a fluff vertex offset parameter. The fluff noise-wave parameter is a parameter of adding random bending in the initial growth direction of the fluff to improve the authenticity of the rendered fluff. The parameter U in the fluff UV offset parameter identifies the fluff offset in the horizontal direction and parameter V in the fluff UV offset parameter identifies the fluff offset in the vertical direction. The fluff flow direction parameter is a parameter of controlling the growth direction of the fluff to render the accumulation effect of the fluff.

S202: rendering the object to be rendered according to the fluff rendering parameter, to obtain a fluff modeling of the object to be rendered.

Upon obtaining the fluff rendering parameter, rendering the object to be rendered according to the fluff rendering parameter to render a diverse fluff modeling on the object to be rendered.

Figure 3A:
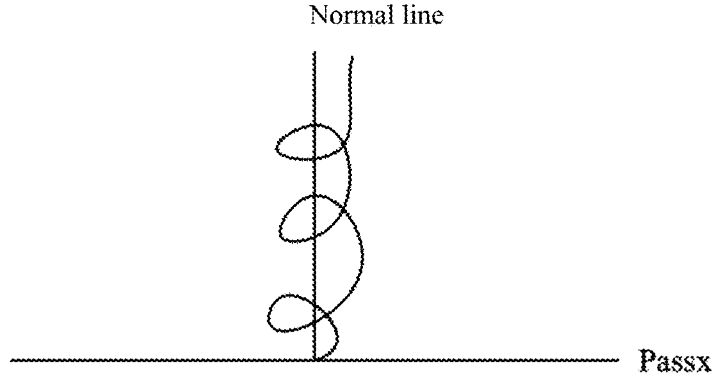
FIG. 3*a* is a schematic view of a fluff spiral according to an embodiment of the present disclosure.

Optionally, in response to the fluff rendering parameter including a fluff spiral parameter, the number of spiral turns of fluff is determined according to the fluff spiral parameter, and the object to be rendered is rendered according to the number of spiral turns of fluff to obtain fluff spiral modeling of the object to be rendered. That is, when the fluff rendering parameter includes the fluff spiral parameter, the number of spiral turns of the fluff around the normal is determined according to the fluff spiral parameter, and the spiral modeling of the fluff is determined according to the number of spiral turns. As shown in FIG. 3*a*, Pass-x represents the x-th layer in the multi-Pass. Under normal circumstances, the fluff grows along the normal direction of the x-th layer, and the added spiral effect means that the fluff spirals around the normal line. It should be noted that FIG. 3*a* is only used to illustrate the spiral effect, and because the fluff is relatively short, its spiral effect around the normal line is determined according to the actual situation.

Specifically, when determining the number of spiral turns of the fluff, determining the spiral angle of the fluff according to the fluff spiral parameter; and then determining the number of spiral turns of the fluff based on the spiral angle of the fluff. Determining the spiral angle of the fluff according to the fluff spiral parameter, includes:

performing vector product calculation according to a normal vector of a rendering model and a preset global direction vector to obtain a first vector; performing vector product calculation according to the first vector and the normal vector to obtain a second vector; determining a first angle based on the fluff spiral parameter and a coefficient for a current pass in the rendering model; determining a spiral angle of the fluff according to the first vector, the second vector, and the first angle. The normal vector of the rendering model is the vector of the initial growth direction of the fluff, and the coefficient for a current pass in the rendering model refers to the coefficient for the pass currently being rendered in the multi-pass rendering model. The specific implementation may be seen in the following calculation formula:

side=normalize(cross(varWorldNormal,vec3(0.0, 1.0.0.0))); 1.

up=normalize(cross(side,varWorldNormal)); 2.

angle=FURLEVEL*10.0*PI*SpiralPow; 3.

dir=normalize(dir*FURLEVEL*10.0+normalize (side*cos(angle)+up*sin(angle))*0.8). 4.

Where "side" represents the first vector, "varWorldNormal" represents the normal vector which is a three-dimensional vector, "vec3 (0.0, 1.0. 0.0)" represents a global direction vector, the "cross" function represents computing a vector product, the output of the cross function is a three-dimensional vector, and the "normalize" function represents performing normalization processing. "up" represents a second vector. "angle" represents the first angle, "FURLEVEL" represents the coefficient corresponding to the current Pass layer, "PI" represents the circumference rate, and "SpiralPow" represents the spiral parameter which is a factor used to control the spiral frequency, typically in the range [0, 1]. The "dir" on the right side of the equal sign represents the vector of the direction of the current fluff, and the "dir" on the left side of the equal sign represents the vector of the direction of the fluff after adding the spiral, i.e., the spiral angle of the fluff. When the calculation in step 4 is performed for the first time, the "dir" on the right side of the equal sign represents the initial growth direction of the fluff, i.e., the normal direction; after many iterations, the "dir" on the right side of the equal sign in step 4 represents the current actual growth direction of the fluff.

Figure 3B:
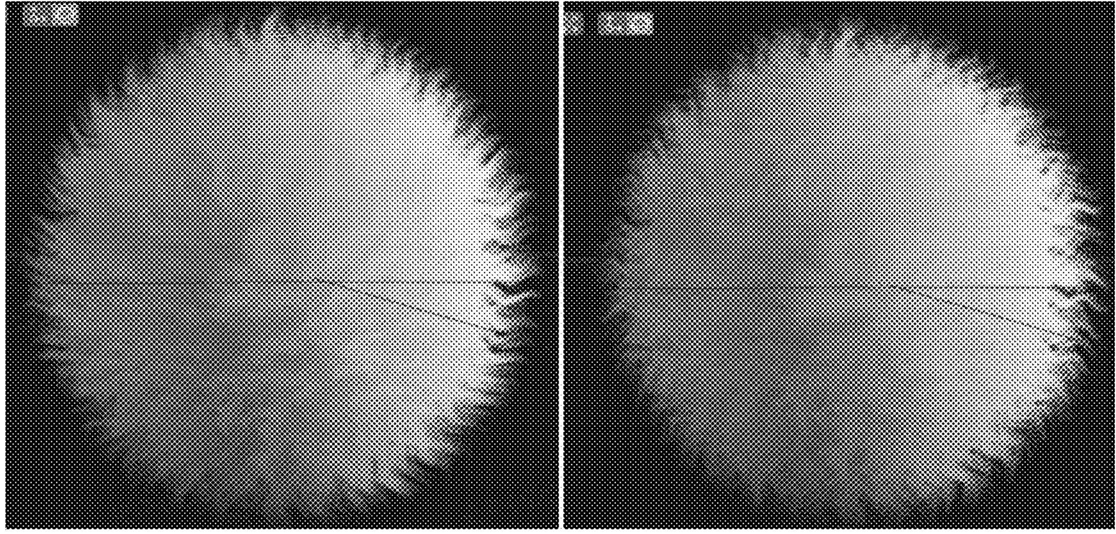
FIG. 3*b* illustrates an effect of a fluff spiral molding according to an embodiment of the present disclosure.

It should be noted that for fluff rendering based on multi-Pass, the spiral modeling for each Pass fluff may be achieved in the manner described above. For example, FIG. 3*b* shows a fluff spiral-type effect graph, where the left graph corresponds to a spiral parameter SpiralPow=0.3 and the right graph corresponds to a spiral parameter SpiralPow=0.4.

Optionally, in response to the fluff rendering parameter including a fluff tail shape parameter, determining a tail shape of the fluff according to the fluff tail shape parameter, and rendering the object to be rendered according to the tail shape of the fluff, obtaining a fluff tail modeling of the object to be rendered. When the fluff tail shape parameter is greater than zero, the tail shape of the fluff takes on a sharp spike shape; when the tail shape parameter is less than zero, the tail shape of the fluff appears like a feather duster.

First, when the fluff tail shape parameter is less than zero: determining the tail shape of the fluff according to the fluff tail shape parameter may include: determining a first value by taking a coefficient for a current pass in a rendering model as a base and the fluff tail shape parameter as an exponent; determining a tail shape of the fluff based on the first value and a grayscale value of a tail mask map of the fluff. The tail mask map of the fluff may be acquired by sampling the fluff tail image. Specifically, the tail shape of the fluff may be determined by:

$$SP\cdot\text{transluency}=\text{pow}(1.1-\text{FURLEVEL},3.0+\text{FurTailFactor})-1.0+t\_\text{mask}\cdot r$$

where "SP.transluency" represents the transparency of the pixel for reflecting the tail shape of the fluff; the function "pow (x, y)" is used to value x to the power of y; "FurTailFactor" represents a fluff tail shape parameter; "FURLEVEL" represents the coefficient for the current Pass layer; "t_mask.r" representing the grayscale value of the pixel sampling at the tail of the fluff.

When SP.transluency is calculated, it is also judged whether SP.transluency is less than a preset threshold, and if so, it indicates low transparency, the SP.transluency is discarded. For example, when SP.transluency is less than 0.00001, then SP.transluency is discarded.

Second, when the fluff tail shape parameter is greater than or equal to zero:

determining a tail shape of the fluff according to the fluff tail shape parameter may include: determining a second value by taking a grayscale value of a tail mask map of the fluff as a base and the fluff tail shape parameter as an exponent; determining a third value by taking a coefficient for a current pass in a rendering model as a base and the fluff tail shape parameter as an exponent; determining a tail shape of the fluff based on a difference between the second value and the third value. See in particular the following calculation formula:

$$SP\cdot\text{transluency}=\text{pow}(t\_\text{mask}\cdot r,\text{FurTailFactor})-\text{pow}(\text{FURLEVEL},\text{FurTailFactor})$$

When SP.transluency is calculated, it is also determined whether SP.transluency is less than a preset threshold and FURLEVEL is less than zero. If both are yes, indicating low transparency, the SP.transluency is discarded.

When the fluff tail shape parameter is greater than zero, the greater the value of the fluff tail shape parameter, the greater the spiking of the fluff tail.

Optionally, in response to the fluff rendering parameter including a fluff bending parameter, determining a bending direction of the fluff according to the fluff bending parameter, and rendering the object to be rendered according to the bending direction of the fluff, to obtain a fluff bending modeling of the object to be rendered. That is, the fluff renderer may determine a bending direction of the fluff according to the fluff bending parameter, and then render the fluff of the object to be rendered according to the bending direction, such that the rendered fluff has a bending modeling. The bending direction of the fluff refers to a direction offset from the initial growth direction of the fluff, the initial growth direction of the fluff is the normal direction of the rendering model. That is, the offset amount is increased in the initial growth direction of the fluff, so that the fluff appears to be bent, thereby making the rendering effect more realistic.

The bending effect of the fluff may be achieved by increasing the fluff noise-wave, UV offset, flow direction parameter, vertex offset, and the like.

1. Specifically, when the fluff bending parameter includes the fluff noise-wave parameter, the bending direction may be determined by: performing vector product calculation according to a normal vector of a rendering model and a preset global direction vector, to obtain a third vector; performing vector product calculation according to the third vector and the normal vector, to obtain a fourth vector; determining a second angle according to a coefficient for a current pass in the rendering model and a vertex coordinate of the current pass; determining the bending direction of the fluff according to the third vector, the fourth vector, the second angle, and the fluff noise-wave parameter. The vertex coordinate of the current pass represents the vertex coordinate value under the local coordinate system to which the current pass corresponds. Specifically, it may be achieved by:

```
side=normalize(cross(varWorldNormal,vec3(0.0,1.0,0.0)));        1.

up=normalize(cross(side,varWorldNormal));                        2.

angle=PI/noise(VB·local_position+FURLEVEL);                      3.

dir=normalize(dir+side*sin(angle)*NoisePow+up*cos(angle))*NoisePow.   4.
```

Where "side" represents the first vector, "up" represents the second vector, "VB.local_position" represents the vertex coordinate value under the local coordinate system, "FURLEVEL" represents the coefficient for the current pass, "noise ( )" represents a random function, and "NoisePow" represents a fluff noise-wave parameter, and the larger the parameter, the greater the randomness of the bending direction of the fluff. The relevant implications of the other parameters may be found in the relevant description of the fluff spiral parameter described above.

Figure 3C:
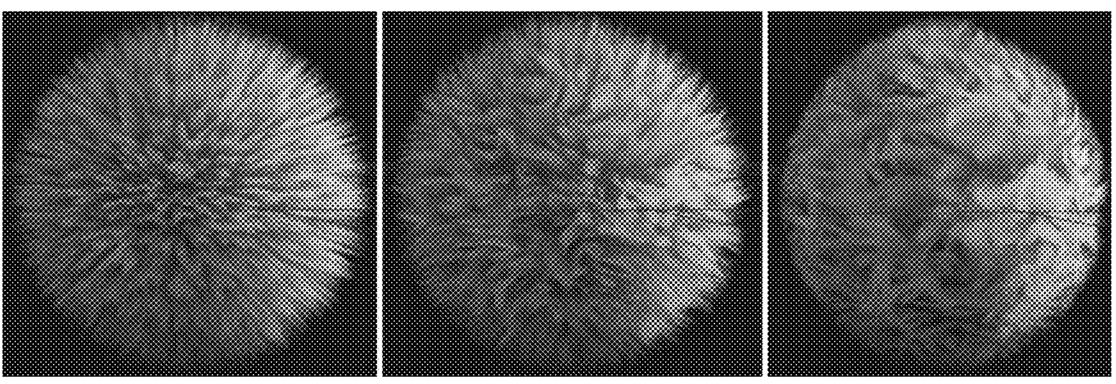
FIG. 3*c* illustrates an effect of noise-affected bending of fluff according to an embodiment of the present disclosure.

For example, FIG. 3*c* shows a schematic representation of the effect of fluff bending, where the noise-wave parameter NoisePow=0 in the first graph, the noise-wave parameter NoisePow=0.5 in the second graph, and the noise-wave parameter NoisePow=2.0 in the third graph.

2. When the fluff bending parameter includes the fluff UV offset parameter, the bending direction of the fluff may be determined by following steps: determining the bending direction of the fluff based on the fluff UV offset parameter, a mask map of the fluff, a texture coordinate, and a scaling factor of the texture coordinate. Therein, the mask map of the fluff may be determined by sampling the fluff image. Specifically, the implementation may be calculated by the following formula:

$$t\_mask\text{–}Texture2DScale(FurStyleMask, FB\cdot texcoord0+uvoffset/FurMaskScale, FurMaskScale)$$

where "t_mask" represents the grayscale value of the mask map of the fluff pixel, which is used to reflect the fluff bending direction. The function "Texture2DScale ( )" is used to sample the texture, "FurStyleMask" represents the fluff mask map, which determines the initial shape of the fluff; "Fb.texcoord0" represents the texture coordinate; "uvoffset" represents the fluff UV offset parameter; "FurMaskScale" represents the scaling factor of the texture coordinate.

Figure 3D:
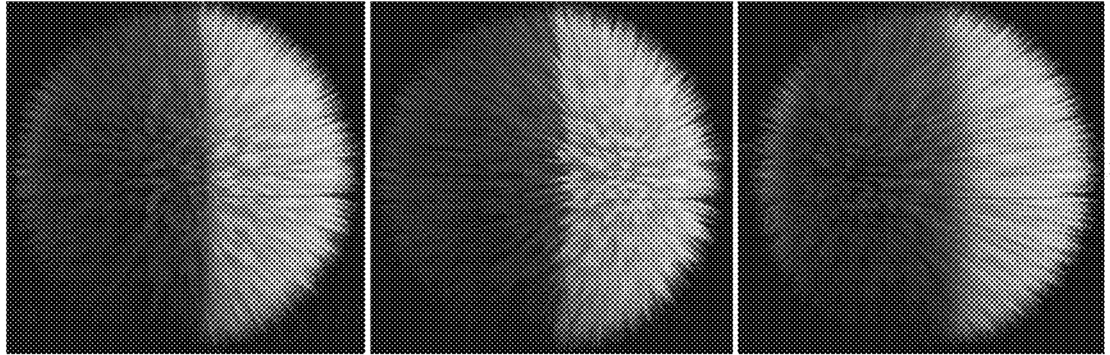
FIG. 3*d* illustrates an effect of fluff UV deflection according to an embodiment of the present disclosure.

Referring to the schematic diagram of fluff UV offset effect shown in FIG. 3*d*, where uvoffset=(0, 0) in the first graph, uvoffset=(1.6, 0) in the second graph and the fluff is shifted to the left, and uvoffset=(−1.6, 0) in the third graph and the fluff is shifted to the right.

3, when the fluff bending parameter includes a fluff flow direction parameter, the fluff flow direction parameter may be a flow direction map, and in the flow direction map, the R pass identifies the horizontal offset magnitude with the right direction as the positive direction; the G pass identifies the vertical offset magnitude with the upper direction as the positive direction. The fluff UV offset values may be obtained by sampling the flow map, and the bending direction of the fluff is opposite to the direction of the fluff UV offset values. Specifically, determining a UV offset amount according to the fluff flow direction parameter; determining the bending direction of the fluff according to the UV offset amount and a coefficient for a current pass in a rendering model. The bending direction of the fluff may be determined in particular by:

$$t\_flowmap=Texture2DScale(FlowMapture, FB\cdot texcoord0, FlowMapScale)$$

$$t\_uvoffset=t\_flowmap\cdot xy*2.0-vec2(1.0,1.0)$$

$$uvoffset=t\_uvoffset*FURLEVEL*FlowMapPow*0.1+uvoffset$$

where "t_flowmap" represents a fluff flow direction map, i.e., a fluff flow direction parameter; the function "Texture2DScale( )" is used to sample the texture; "FlowMapture" represents a flow direction texture; "Fb.texcoord0" represents a texture coordinate; "FlowMapScale" represents a scaling coefficient of the texture coordinate; "t_uvoffset" represents the UV offset amount sampled from the flow direction map; "FlowMapPow" represents a coefficient for adjusting the offset intensity.

4, when the fluff bending parameter includes a fluff vertex offset parameter, the fluff bending direction may be determined by the following steps: determining the bending direction of the fluff based on the fluff vertex offset parameter, a normal direction of a rendering model, and an interpolation coefficient, and the interpolation coefficient reflects an influence degree of the fluff vertex offset parameter on the normal direction.

If (length (Vb.model_color.xyz)>0.0)

dir=normalize (mix (varWorldNormal, normalize (Vb.model_color.xyz), u_colorDirFactor)); where "varWorldNormal" represents the initial growth direction of the fluff, "VB.model_color.xyz" represents the offset direction increased at the vertex, and "u_ColorDirFactor" represents the interpolation coefficient of these two directions, indicating that the greater the influence of the offset direction increased at the vertex on the initial growth direction, the greater the interpolation coefficient, which indicates the insertion force is greater. "mix( )" represents a blending function for blending the initial growth direction and the offset direction on the vertex according to the interpolation coefficient, and "dir" represents the final bending direction of the fluff after blending.

It is to be noted that the above-described decision is made to determine that offset direction increased at the vertex is a legitimate direction.

The technical solution provided by the embodiments of the present application, when rendering the object to be rendered, obtaining a fluff rendering parameter for the object to be rendered, the fluff rendering parameter including one or more modeling parameters for the fluff. Each of the one or more molding parameters corresponds to one fluff molding effect. After obtaining the fluff rendering parameter, rendering the object to be rendered according to the fluff rendering parameter to obtain a fluff modeling of the object to be rendered. As can be seen, according to the embodiment of the disclosure, the fluff with various shapes is rendered by obtaining various fluff modeling parameters in advance, so that the diversity of fluff modeling is improved.

In addition, when rendering an object to be rendered, in addition to determining the modeling of the fluff, the basic parameters of the fluff rendering are obtained, i.e., the fluff rendering parameters may also include the basic parameters. For example, the fluff length parameter, the fluff thickness parameter and the fluff density parameter to achieve rendering of the fluff according to the basic parameters and to add a modeling on the rendered fluff.

Based on the above method embodiments, the present application embodiments provide a fluff rendering apparatus and device, which will be explained below in conjunction with the accompanying drawings.

Figure 4:
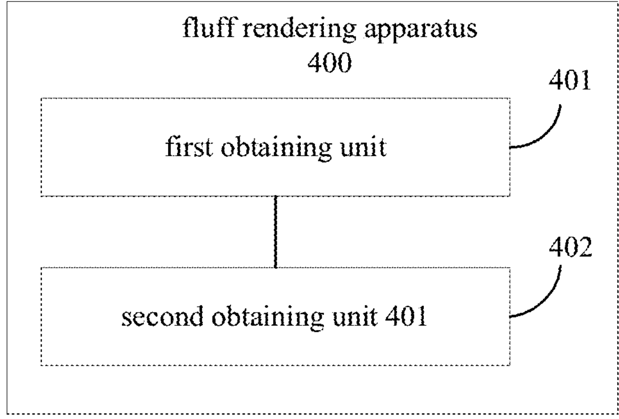
FIG. 4 illustrates a fluff rendering apparatus according to an embodiment of the present disclosure.

Referring to FIG. 4, which is a schematic diagram of a fluff rendering apparatus according to an embodiment of the present disclosure, the apparatus 400 may include a first obtaining unit 401 and a second obtaining unit 402.

a first obtaining unit 401 configured to obtain a fluff rendering parameter for an object to be rendered, where the fluff rendering parameter includes one or more modeling parameters for fluff, different modeling parameters among the one or more modeling parameters are used to render the fluff with different shapes, the object to be rendered is an object requiring fluff rendering. Therein, the specific implementation regarding the first acquiring unit 401 may refer to the related description of the above method S201.

a second obtaining unit 402 configured to render the object to be rendered according to the fluff rendering parameter, to obtain a fluff modeling of the object to be rendered. Therein, the specific implementation regarding the second acquiring unit 402 may refer to the related description of the above method S202.

In a specific implementation, the fluff rendering parameter includes at least one selected from the group consisting of a fluff spiral parameter, a fluff tail shape parameter, and a fluff bending parameter.

In a specific implementation form, the second obtaining unit 402 is specifically configured to, in response to the fluff rendering parameter including a fluff spiral parameter, determine a count of spiral turns of the fluff according to the fluff spiral parameter, and render the object to be rendered according to the count of spiral turns of the fluff, to obtain the fluff modeling of the object to be rendered.

In a specific implementation form, the second obtaining unit 402 is specifically configured to, in response to the fluff rendering parameter including a fluff spiral parameter, determine a spiral angle of the fluff according to the fluff spiral parameter; determine the count of spiral turns of the fluff according to the spiral angle of the fluff.

In a specific implementation, the second obtaining unit 402 is specifically configured to perform vector product calculation according to a normal vector of a rendering model and a preset global direction vector to obtain a first vector; perform vector product calculation according to the first vector and the normal vector to obtain a second vector; determine a first angle based on the fluff spiral parameter and a coefficient for a current pass in the rendering model; determine the spiral angle of the fluff according to the first vector, the second vector, and the first angle.

In a specific implementation form, the second obtaining unit 402 is specifically configured to, in response to the fluff rendering parameter including a fluff tail shape parameter, determining a tail shape of the fluff according to the fluff tail shape parameter, and rendering the object to be rendered according to the tail shape of the fluff, to obtain the fluff modeling of the object to be rendered.

In a particular implementation form, the second acquisition unit 402 is particularly configured to, when the fluff tail shape parameter is less than zero, determine a first value by taking a coefficient for a current pass in a rendering model as a base and the fluff tail shape parameter as an exponent; determine the tail shape of the fluff based on the first value and a grayscale value of a tail mask map of the fluff.

In a particular implementation form, the second obtaining unit 402 is particularly configured to, when the fluff tail shape parameter is greater than or equal to zero, determine a second value by taking a grayscale value of a tail mask map of the fluff as a base and the fluff tail shape parameter as an exponent; determine a third value by taking a coefficient for a current pass in a rendering model as a base and the fluff tail shape parameter as an exponent; determine the tail shape of the fluff based on a difference between the second value and the third value.

In a specific implementation, when the fluff tail shape parameter is greater than zero, the tail shape of the fluff is in a spike shape; when the fluff tail shape parameter is less than zero, the tail shape of the fluff presents as a feather duster.

In a specific implementation form, the second obtaining unit 402 is specifically configured to, in response to the fluff rendering parameter including a fluff bending parameter, determine a bending direction of the fluff according to the fluff bending parameter, and render the object to be rendered according to the bending direction of the fluff, to obtain the fluff modeling of the object to be rendered.

In a specific implementation, the fluff bending parameter includes at least one selected from the group consisting of a fluff noise-wave parameter, a fluff UV offset parameter, a fluff flow direction parameter, and a fluff vertex offset parameter.

In a specific implementation form, the second obtaining unit 402 is specifically configured to, in response to the fluff bending parameter including the fluff noise-wave parameter, perform vector product calculation according to a normal vector of a rendering model and a preset global direction vector, to obtain a third vector; perform vector product calculation according to the third vector and the normal vector, to obtain a fourth vector; determining a second angle according to a coefficient for a current pass in the rendering model and a vertex coordinate of the current pass; determine the bending direction of the fluff according to the third vector, the fourth vector, the second angle, and the fluff noise-wave parameter.

In a specific implementation form, the second obtaining unit 402 is configured to determine, in response to the fluff bending parameter including the fluff UV offset parameter, the bending direction of the fluff based on the fluff UV offset parameter, a mask map of the fluff, a texture coordinate, and a scaling factor of the texture coordinate.

In a specific implementation form, the second acquisition unit 402 is specifically configured to determine, in response to the fluff bending parameter comprising the fluff flow direction parameter, a UV offset amount according to the fluff flow direction parameter; determine the bending direction of the fluff according to the UV offset amount, a coefficient for a current pass in a rendering model.

In a particular implementation form, the second obtaining unit 402 is specifically configured to determine, in response to the fluff bending parameter including the fluff vertex offset parameter, the bending direction of the fluff based on the fluff vertex offset parameter, a normal direction of a rendering model, and an interpolation coefficient, wherein the interpolation coefficient reflects an influence degree of the fluff vertex offset parameter on the normal direction.

It needs to be explained that the implementation of the respective units in the present embodiment can be referred to the related description in the above method embodiment, and the present embodiment will not be described in detail herein.

Figure 5:
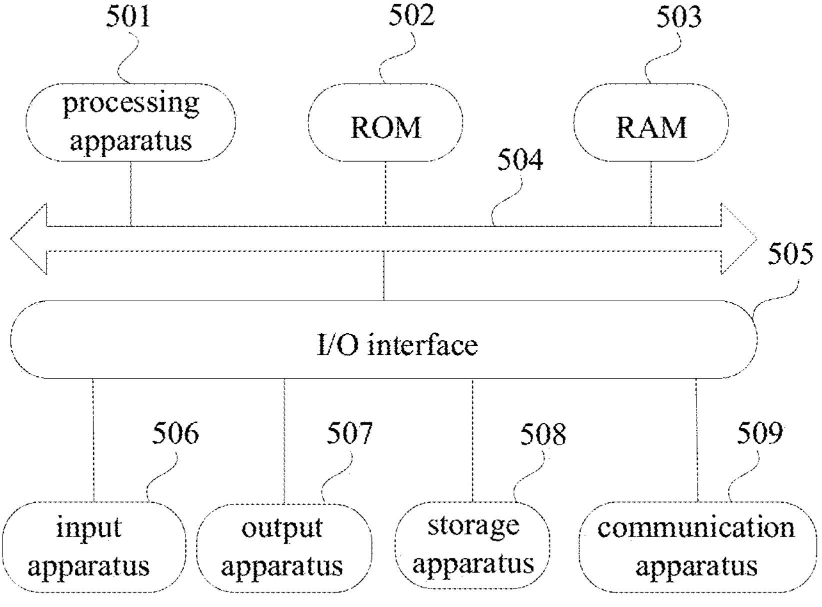
FIG. 5 shows an electronic device according to an embodiment of the present disclosure.

Reference is now made to FIG. 5, which shows a structural schematic diagram of an electronic device (for example, a terminal device or a server in FIG. 5) 500 suitable for implementing an embodiment of the present disclosure. The terminal devices in the embodiments of the present disclosure may include, but not limited to, mobile terminals such as a mobile phone, a notebook computer, a digital broadcast receiver, a personal digital assistant (Personal Digital Assistant, PDA), a tablet computer (Portable Android Device, PAD), a portable multimedia player (Portable Media Player, PMP), a vehicle-mounted terminal (for example, a vehicle-mounted navigation terminal) and the like, and fixed terminals such as a digital TV, a desktop computer and the like. The electronic device 500 shown in FIG. 5 is only an example, and should not bring any limitation to the functions and application scope of the embodiments of the present disclosure.

As shown in FIG. 5, the electronic device 500 may include a processing apparatus (for example, a central processing unit, a graphics processing unit, etc.) 501, which may perform various appropriate actions and processes according to programs stored in a read-only memory (Read-Only Memory, ROM) 502 or programs loaded from a storage apparatus 508 into a random access memory (Random Access Memory, RAM) 503. In the RAM 503, various programs and data required for operations of the electronic device 500 are also stored. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506 including, for example, a touch screen, a touch pad, a keyboard, a mouse, a camera, a microphone, an accelerometer, a gyroscope, etc.; an output apparatus 507 including, for example, a liquid crystal display (Liquid Crystal Display, LCD), a speaker, a vibrator, etc.; a storage apparatus 508 including, for example, a magnetic tape, a hard disk, etc.; and a communication apparatus 509. The communication apparatus 509 may allow the electronic device 500 to perform wireless or wired communication with other devices to exchange data. While the electronic device 500 with various apparatuses is shown in FIG. 5, it should be understood that it is not required to implement or have all the apparatuses shown. More or fewer apparatuses may alternatively be implemented or provided.

According to the embodiments of the present disclosure, processes described above with reference to the flowchart may be implemented as a computer software program. For example, an embodiment of the present disclosure includes a computer program product, which includes a computer program carried on a non-transitory computer-readable medium, the computer program including program codes for performing the method shown in the flowchart. In such an embodiment, the computer program may be downloaded and installed from a network through the communication apparatus 509, or installed from the storage apparatus 508, or installed from the ROM 502. When the computer program is executed by the processing apparatus 501, the above functions defined in the fluff rendering method of the embodiment of the present disclosure are performed.

The electronic device provided by the embodiment of the present disclosure belongs to the same disclosed concept as the fluff rendering method provided by the embodiment above, technical details that are not described in detail in the present embodiment can be referred to the embodiments above, and the present embodiment has the same advantageous effects as the embodiments above.

An embodiment of the present disclosure provides a computer storage medium having stored thereon a computer program, which, when executed by a processor, implement the fluff rendering method provided in the embodiment above.

It should be noted that the computer-readable medium mentioned above in the present disclosure may be a computer-readable signal medium or a computer-readable storage medium or any combination of both. The computer-readable storage medium may be, for example, but not limited to, an electrical, magnetic, optical, electromagnetic, infrared, or semiconductor system, apparatus or device, or a combination of any of the above. More specific examples of the computer-readable storage medium may include, but not limited to: an electrical connection with one or more wires, a portable computer disk, a hard disk, a random access memory (RAM), a read-only memory (ROM), an erasable programmable read-only memory (EPROM) or flash memory, an optical fiber, a portable compact disk read-only memory (CD-ROM), an optical storage device, a magnetic storage device, or any suitable combination of the above. In the present disclosure, the computer-readable storage medium may be any tangible medium containing or storing a program, which program may be used by or in combination with an instruction execution system, apparatus or device. In the present disclosure, the computer-readable signal medium may include a data signal propagated in a baseband or as part of a carrier wave, in which computer-readable program codes are carried. This propagated data signal may take multiple forms, including but not limited to electromagnetic signals, optical signals or any suitable combination of the above. The computer-readable signal medium may also be any computer-readable medium other than the computer-readable storage medium, and may send, propagate or transmit a program used by or in combination with an instruction execution system, apparatus or device. The program codes contained in the computer-readable medium may be transmitted by any suitable medium, including but not limited to: electric wires, optical cables, radio frequency (RF) and the like, or any suitable combination of the above.

In some implementations, the client and the server can communicate by using any currently known or future developed network protocol such as a hypertext transfer protocol (HTTP), and may be interconnected with digital data communication in any form or medium (for example, a communication network). Examples of the communication network include a local area network (Local Area Network, LAN), a wide area network (Wide Area Network, WAN), the Internet work (for example, the Internet) and an end-to-end network (for example, an ad hoc end-to-end network), as well as any currently known or future developed networks.

The computer-readable medium described above may be included in the electronic device; or it may exist alone without being assembled into the electronic device.

The computer-readable medium carries one or more programs which, when executed by the electronic device, cause the electronic device to perform the above fluff rendering method.

Computer program codes for performing the operations of the present disclosure may be written in one or more programming languages or combinations thereof, including but not limited to object-oriented programming languages such as Java, Smalltalk and C++, and conventional procedural programming languages such as "C" or similar programming languages. The program codes may be completely executed on a user computer, partially executed on the user computer, executed as an independent software package, partially executed on the user computer and partially executed on a remote computer, or completely executed on the remote computer or a server. In the case involving the remote computer, the remote computer may be connected to the user computer through any type of network, including a local area network (LAN) or a wide area network (WAN), or may be connected to an external computer (for example, through the Internet using an Internet service provider).

The flowchart and block diagrams in the drawings illustrate architectures, functions and operations of possible implementations of the systems, methods and the computer program product according to various embodiments of the present disclosure. In this regard, each block in the flowchart or block diagram may represent a part of a module, a program segment, or codes, which includes one or more executable instructions for implementing specified logical functions. It is also noted that, in some alternative implementations, the functions noted in the block may occur out of the order noted in the figures. For example, two blocks shown in succession may, in fact, be executed substantially in parallel, and may sometimes be executed in the reverse order, depending on the functions involved. It is also noted that each block in the block diagrams and/or flowcharts, and combinations of blocks in the block diagrams and/or flow diagrams, may be implemented by a dedicated hardware-based system that performs specified functions or operations, or by a combination of dedicated hardware and computer instructions.

The units involved in the embodiments described in the present disclosure may be implemented by software or hardware. The name of the unit does not constitute a limitation on the unit itself in some cases. Among them, the name of the unit/module does not limit the unit itself in some cases. For example, the voice data acquisition module can also be described as a "data acquisition module".

The functions described above herein may be at least partially performed by one or more hardware logic components. For example, without limitation, exemplary types of hardware logic components that may be used include: a field programmable gate array (Field Programmable Gate Array, FPGA), an application-specific integrated circuit (Application Specific Integrated Circuit, ASIC), an application specific standard product (Application Specific Standard Parts, ASSP), a system-on-chip (System on Chip, SOC), a complex programmable logic device (CPLD) and the like.

In the context of the present disclosure, the machine-readable medium may be a tangible medium that may include or store a program used by or in connection with an instruction execution system, apparatus or device. The machine-readable medium may be a machine-readable signal medium or a machine-readable storage medium. The machine-readable medium may include, but not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

It is to be understood that the various embodiments are described in an incremental fashion throughout this specification, and that each embodiment is emphasized as differing from the other embodiments, and that like parts of the various embodiments may be referred to with respect to each other. As for the system or apparatus of the embodiments disclosed herein, the description is relatively simple because it corresponds to the method of the embodiments disclosed herein, where relevant, see the methods section description.

It is to be understood that, in this application, "at least one" means one or more and "a plurality" means two or more. "And/or", used to describe an association relation of an associated object, means that three kinds of relations may exist, for example, "A and/or B" may mean that only A exists, only B exists, and both A and B exist, where A and B may be singular or plural. The character "/" generally indicates that the contextual object is an "OR" relationship. At least one of the following" or similar expressions, refers to any combination of these items, including any combination of single or plural items. For example, at least one of a, b, or c may mean: a, b, c, "a and b", "a and c", "b and c", or "a and b and c", wherein a, b, and c may be a single or a plurality.

It is further noted that in this document relational terms such as first and second, and the like, are used solely to distinguish one entity or operation from another entity or operation without necessarily requiring or implying any actual such relationship or order between such entities or operations. Furthermore, the terms "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by the statement "comprises a . . . " does not, without more constraints, preclude the existence of additional identical elements in the process, method, article, or apparatus that comprises the element.

The steps of a method or algorithm described in connection with the embodiments disclosed herein may be embodied directly in hardware, in a software module executed by a processor, or in a combination of the two. A software module may reside in random access memory (RAM), memory, read-only memory (ROM), electrically programmable ROM, electrically erasable programmable ROM, registers, hard disk, a removable disk, a CD-ROM, or any other form of storage medium known in the art.

The previous description of the disclosed embodiments is provided to enable any person skilled in the art to make or use the present application. Various modifications to these embodiments will be readily apparent to those skilled in the art, and the generic principles defined herein may be implemented in other embodiments without departing from the spirit or scope of the application. Thus, the present application is not intended to be limited to the embodiments shown herein but is to be accorded the widest scope consistent with the principles and novel features disclosed herein.

What is claimed is:

1. A fluff rendering method, comprising:

obtaining a fluff rendering parameter for an object to be rendered, wherein the fluff rendering parameter comprises one or more modeling parameters for fluff, different modeling parameters among the one or more modeling parameters are used to render the fluff with different physical shapes, the object to be rendered is an object requiring fluff rendering, the fluff with the different physical shapes comprises at least one selected from a group consisting of a fluff spiral modeling, a tail shape modeling of the fluff, and a fluff bending modeling, wherein the fluff spiral modeling refers to a modeling where the fluff spirals around an initial growth direction, the tail shape modeling of the fluff refers to a hair tail shape of the fluff, and the fluff bending modeling refers to a bending effect of the fluff with respect to the initial growth direction; and rendering the object to be rendered according to the fluff rendering parameter, to obtain a fluff modeling of the object to be rendered.

2. The fluff rendering method according to claim 1, wherein the fluff rendering parameter comprises at least one selected from a group consisting of a fluff spiral parameter, a fluff tail shape parameter, and a fluff bending parameter.

3. The fluff rendering method according to claim 2, wherein the rendering the object to be rendered according to the fluff rendering parameter, to obtain a fluff modeling of the object to be rendered, comprises:

in response to the fluff rendering parameter comprising the fluff spiral parameter, determining a count of spiral turns of the fluff according to the fluff spiral parameter, and rendering the object to be rendered according to the count of spiral turns of the fluff, to obtain the fluff modeling of the object to be rendered.

4. The fluff rendering method according to claim 3, wherein in response to the fluff rendering parameter comprising a fluff spiral parameter, determining a count of spiral turns of the fluff according to the fluff spiral parameter, comprises:

in response to the fluff rendering parameter comprising the fluff spiral parameter, determining a spiral angle of the fluff according to the fluff spiral parameter;

determining the count of spiral turns of the fluff according to the spiral angle of the fluff.

5. The fluff rendering method according to claim 4, wherein the determining a spiral angle of the fluff according to the fluff spiral parameter, comprises:

performing vector product calculation according to a normal vector of a rendering model and a preset global direction vector to obtain a first vector;

performing vector product calculation according to the first vector and the normal vector to obtain a second vector;

determining a first angle based on the fluff spiral parameter and a coefficient for a current pass in the rendering model;

determining the spiral angle of the fluff according to the first vector, the second vector, and the first angle.

6. The fluff rendering method according to claim 2, wherein the rendering the object to be rendered according to the fluff rendering parameter, to obtain a fluff modeling of the object to be rendered, comprises:

in response to the fluff rendering parameter comprising the fluff tail shape parameter, determining a tail shape of the fluff according to the fluff tail shape parameter, and rendering the object to be rendered according to the tail shape of the fluff, to obtain the fluff modeling of the object to be rendered.

7. The fluff rendering method according to claim 6, wherein the determining a tail shape of the fluff according to the fluff tail shape parameter, comprises:

when the fluff tail shape parameter is less than zero, determining a first value by taking a coefficient for a current pass in a rendering model as a base and the fluff tail shape parameter as an exponent;

determining the tail shape of the fluff based on the first value and a grayscale value of a tail mask map of the fluff.

8. The fluff rendering method according to claim 6, wherein the determining a tail shape of the fluff according to the fluff tail shape parameter, comprises:

when the fluff tail shape parameter is greater than or equal to zero, determining a second value by taking a grayscale value of a tail mask map of the fluff as a base and the fluff tail shape parameter as an exponent;

determining a third value by taking a coefficient for a current pass in a rendering model as a base and the fluff tail shape parameter as an exponent;

determining the tail shape of the fluff based on a difference between the second value and the third value.

9. The fluff rendering method according to claim 6, wherein, when the fluff tail shape parameter is greater than zero, the tail shape of the fluff presents as a spike;

when the fluff tail shape parameter is less than zero, the tail shape of the fluff presents as a feather duster.

10. The fluff rendering method according to claim 2, wherein the rendering the object to be rendered according to the fluff rendering parameter, to obtain a fluff modeling of the object to be rendered, comprises:

in response to the fluff rendering parameter comprising the fluff bending parameter, determining a bending direction of the fluff according to the fluff bending parameter, and rendering the object to be rendered according to the bending direction of the fluff, to obtain the fluff modeling of the object to be rendered.

11. The fluff rendering method according to claim 10, wherein the fluff bending parameter comprises at least one selected from a group consisting of a fluff noise-wave parameter, a fluff UV offset parameter, a fluff flow direction parameter, and a fluff vertex offset parameter.

12. The fluff rendering method according to claim 11, wherein, in response to the fluff rendering parameter comprising the fluff bending parameter, determining a bending direction of the fluff according to the fluff bending parameter, comprises:

in response to the fluff bending parameter comprising the fluff noise-wave parameter, performing vector product calculation according to a normal vector of a rendering model and a preset global direction vector, to obtain a third vector;

performing vector product calculation according to the third vector and the normal vector, to obtain a fourth vector;

determining a second angle according to a coefficient for a current pass in the rendering model and a vertex coordinate of the current pass;

determining the bending direction of the fluff according to the third vector, the fourth vector, the second angle, and the fluff noise-wave parameter.

13. The fluff rendering method of claim 11, wherein, in response to the fluff rendering parameter comprising the fluff bending parameter, determining a bending direction of the fluff according to the fluff bending parameter, comprises:

in response to the fluff bending parameter comprising the fluff UV offset parameter, determining the bending direction of the fluff based on the fluff UV offset parameter, a mask map of the fluff, a texture coordinate, and a scaling factor of the texture coordinate.

14. The fluff rendering method of claim 11, wherein, in response to the fluff rendering parameter comprising the fluff bending parameter, determining a bending direction of the fluff according to the fluff bending parameter, comprises:

in response to the fluff bending parameter comprising the fluff flow direction parameter, determining a UV offset amount according to the fluff flow direction parameter;

determining the bending direction of the fluff according to the UV offset amount, a coefficient for a current pass in a rendering model.

15. The fluff rendering method of claim 11, wherein, in response to the fluff rendering parameter comprising the fluff bending parameter, determining a bending direction of the fluff according to the fluff bending parameter, comprises:

in response to the fluff bending parameter comprising the fluff vertex offset parameter, determining the bending direction of the fluff based on the fluff vertex offset parameter, a normal direction of a rendering model, and an interpolation coefficient, wherein the interpolation coefficient reflects an influence degree of the fluff vertex offset parameter on the normal direction.

16. An electronic device, comprising a processor and a memory, wherein the memory is configured to store instructions or a computer program;

the processor is configured to execute the instructions or the computer program in the memory to cause the electronic device to perform a fluff rendering method, wherein the fluff rendering method comprises:

obtaining a fluff rendering parameter for an object to be rendered, wherein the fluff rendering parameter comprises one or more modeling parameters for fluff, different modeling parameters among the one or more modeling parameters are used to render the fluff with different physical shapes, the object to be rendered is an object requiring fluff rendering, the fluff with the different physical shapes comprises at least one selected from a group consisting of a fluff spiral modeling, a tail shape modeling of the fluff, and a fluff bending modeling, wherein the fluff spiral modeling refers to a modeling where the fluff spirals around an initial growth direction, the tail shape modeling of the fluff refers to a hair tail shape of the fluff, and the fluff bending modeling refers to a bending effect of the fluff with respect to the initial growth direction; and rendering the object to be rendered according to the fluff rendering parameter, to obtain a fluff modeling of the object to be rendered.

17. The electronic device according to claim 16, wherein the processor further causes the electronic device to:

determine, in response to the fluff rendering parameter comprising a fluff spiral parameter, a count of spiral turns of the fluff according to the fluff spiral parameter and render the object to be rendered according to the count of spiral turns of the fluff, to obtain the fluff modeling of the object to be rendered.

18. The electronic device according to claim 17, wherein the processor further causes the electronic device to:

determine, in response to the fluff rendering parameter comprising a fluff spiral parameter, a spiral angle of the fluff according to the fluff spiral parameter;

determine the count of spiral turns of the fluff according to the spiral angle of the fluff.

19. A non-transitory computer-readable storage medium, comprising instructions, wherein, when the instructions are run on a computer, the instructions cause the computer to perform a fluff rendering method, wherein the fluff rendering method comprises:

obtaining a fluff rendering parameter for an object to be rendered, wherein the fluff rendering parameter comprises one or more modeling parameters for fluff, different modeling parameters among the one or more modeling parameters are used to render the fluff with different physical shapes, the object to be rendered is an object requiring fluff rendering, the fluff with the different physical shapes comprises at least one selected from a group consisting of a fluff spiral modeling, a tail shape modeling of the fluff, and a fluff bending modeling, wherein the fluff spiral modeling refers to a modeling where the fluff spirals around an initial growth direction, the tail shape modeling of the fluff refers to a hair tail shape of the fluff, and the fluff bending modeling refers to a bending effect of the fluff with respect to the initial growth direction; and rendering the object to be rendered according to the fluff rendering parameter, to obtain a fluff modeling of the object to be rendered.

* * * * *